(12) United States Patent  
Tsuchitoi

(10) Patent No.: US 7,218,404 B2  
(45) Date of Patent: May 15, 2007

(54) PRINTING APPARATUS, PRINT CONTROL METHOD, AND RECORDING MEDIUM STORING PRINT CONTROL PROGRAM THEREIN

(75) Inventor: Naoki Tsuchitoi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/929,458

(22) Filed: Aug. 31, 2004

(65) Prior Publication Data

US 2005/0030572 A1 Feb. 10, 2005

Related U.S. Application Data

(62) Division of application No. 09/289,943, filed on Apr. 13, 1999, now Pat. No. 6,831,753.

(30) Foreign Application Priority Data

Apr. 14, 1998 (JP) ............................. 10-103056  
Aug. 28, 1998 (JP) ............................. 10-243434

(51) Int. Cl.  
*G06F 3/12* (2006.01)  
*F06F 15/00* (2006.01)  
*G06K 1/00* (2006.01)

(52) U.S. Cl. .................. 358/1.13; 358/1.14; 358/1.15; 358/1.16

(58) Field of Classification Search ............... 358/1.13, 358/1.14, 1.15, 440; 709/229, 249  
See application file for complete search history.

(56) References Cited

U.S. PATENT DOCUMENTS

| 5,142,624 | A |   | 8/1992 | Patrick | ..................... 709/226 |
| 5,473,691 | A |   | 12/1995 | Menezes et al. | ............ 713/161 |
| 5,651,114 | A | * | 7/1997 | Davidson, Jr. | ............... 709/229 |
| 6,741,606 | B1 |   | 5/2004 | Mori | ......................... 370/463 |

FOREIGN PATENT DOCUMENTS

EP 0921473 A2 6/1999  
JP 11-168524 6/1999

* cited by examiner

*Primary Examiner*—Twyler Lamb  
*Assistant Examiner*—Yixing Qin  
(74) *Attorney, Agent, or Firm*—Fitzpatrick, Cella, Harper & Scinto

(57) ABSTRACT

A printing apparatus discriminates whether received print data is print data converted into a job packet constructed by a header portion and a data portion or print data which is not converted into a job packet and switches the processing operation in accordance with the print data.

9 Claims, 14 Drawing Sheets

FIG. 4

| BYTE \ BIT | 7 | 6 | 5 | 4 | 3 | 2 | 1 | 0 |
|---|---|---|---|---|---|---|---|---|
| 0 | | | | OPERATION CODE | | | | |
| 1 | | | | | | | | |
| 2 | | | | BLOCK NO. | | | | |
| 3 | | | | | | | | |
| 4 | | | | PARAMETER LENGTH | | | | |
| 5 | | | | | | | | |
| 6 | ERROR | NOTICE | | | | REPLY REQUEST | CONTINUATION | REPLY |
| 7 | | | | USER ID | | | | |
| 8 | | | | | | | | |
| 9 | | | | | | | | |
| 10 | | | | PASSWORD | | | | |
| 11 | | | | | | | | |
| 12... | | | | DATA | | | | |

FIG. 7

```
JOB MANAGEMENT :

TO USE
```

PRINTING APPARATUS, PRINT CONTROL METHOD, AND RECORDING MEDIUM STORING PRINT CONTROL PROGRAM THEREIN

CROSS REFERENCE TO RELATED APPLICATION

This application is a divisional of application Ser. No. 09/289,943, filed Apr. 13, 1999, now U.S. Pat. No. 6,831,753.

BACKGROUND OF THE INVENTION

1. Field of the Invention

The invention relates to a printing apparatus for processing print data which is transmitted from a host computer to generate the print data in accordance with an instruction of the user, generating image data, and actually printing into a media such as a paper or the like. The invention also relates to a print control method of such a printing apparatus and a recording medium in which a print control program for such a print control method has been stored.

2. Related Background Art

A printing system which satisfies functions such that not only a printing apparatus prints print data that is generated from a host computer but also an information obtaining and an environmental setting of the printing apparatus are performed from the host computer has been known.

FIG. 1 is a diagram for explaining a first print data processing method embodying a method of performing an information obtaining and an environmental setting of a printing apparatus from a host computer.

In FIG. 1, reference numeral 100 denotes a host computer; 150 a printing apparatus; and 180 a predetermined communication medium for connecting the host computer 100 and printing apparatus 150.

Further, the host computer 100 is constructed by: an application section 101 for providing a graphic user interface to the user and generating image data adapted to a purpose of the user; a printer driver 102 for converting the image data generated by the application section 101 into page description language (hereinafter, abbreviated to PDL) data which can be printed by the printing apparatus 150; a transmission buffer 103 for temporarily storing the PDL data formed by the printer driver 102; an I/F driver 104 for transmitting the PDL data stored in the transmission buffer to the printing apparatus 150 and transmitting and receiving information to/from the printing apparatus 150; and a utility section 105 for obtaining the information of the printing apparatus 150 and providing it to the graphic user interface and for changing the environmental setting of the printing apparatus 150 in accordance with a demand of the user.

The printing apparatus 150 is constructed by: an I/F driver 151 for receiving the PDL data and environmental setting transmitted from the host computer 100 and transmitting the information of the printing apparatus 150; a reception buffer 152 for temporarily holding all of the data received by the I/F driver 151 and serving as a buffer device of a delay of processes at the post stage; a JL parser 153 for analyzing the reception data and discriminating by a predetermined job control language (hereinafter, abbreviated to JL) whether the host computer has requested to obtain the information of the printing apparatus or the host computer has transmitted the PDL data, thereby distributing processes; a PDL translator 154 for performing a translating process of the PDL data distributed by the JL parser 153 and converting into a drawing object suitable to draw; a database 158 for storing the information of the printing apparatus set by the JL and providing the information to the JL parser and PDL translator 154; a drawing buffer 155 for temporarily storing the drawing object formed by the PDL translator 154 until it is actually printed; a drawing section 156 for generating a bit map image by actually drawing the drawing object temporarily stored in the drawing buffer 155; and a printer engine 157 for receiving a bit map image generated by the drawing section 156 and printing into a media such as a paper or the like by a well-known printing technique.

The first print data processing method has the following two problems. First, there is a problem such that since a channel to transmit and receive the print data (PDL data) and a channel to obtain the information of the printing apparatus are the same, the transmission and reception of the print data and the information obtaining cannot be simultaneously performed. Second, there is a problem such that since the print data is recognized by the JL parser 153, the print data temporarily stored in the reception buffer 152 is not recognized and management information regarding this print data cannot be returned to the host computer 100.

SUMMARY OF THE INVENTION

To solve the above problems in the first print data processing method, therefore, a second print data processing method is considered.

FIG. 2 is a diagram showing a construction of the second print data processing method. In FIG. 2, reference numeral 200 denotes a host computer; 250 a printing apparatus; and 280 a predetermined communication medium for connecting the host computer 200 and printing apparatus 250.

The host computer 200 is constructed by: an application section 201 for providing a graphic user interface to the user and generating image data adapted to a purpose of the user; a printer driver 202 for converting the image data generated by the application section 201 into page description language (hereinafter, abbreviated to PDL) data which can be printed by the printing apparatus 250; a transmission buffer 203 for temporarily storing the PDL data formed by the printer driver 202; a job packet generator 207 for generating a job packet from the PDL data stored in the transmission buffer 203; a utility section 205 for generating a management packet to obtain the information of the printing apparatus 250 and provide it to the graphic user interface and change the environmental setting of the printing apparatus 250 in accordance with a demand of the user; a logic channel controller 206 for further converting a job packet and a management packet into packet data; and an I/F driver 204 for transmitting and receiving the job packet and management packet which were further converted to the packet data by the logic channel controller 206 to/from the printing apparatus 250. In the invention, the PDL data converted to the job packet is referred to as a job packet and the environmental set data converted to the job packet is referred to as a management packet.

The printing apparatus 250 is constructed by: an I/F driver 259 for receiving the job packet and management packet which were converted to the packet data and transmitted from the host computer 200 and transmitting a management packet for reply converted to the packet data by a logic channel controller 251; the logic channel controller 251 for transmitting the job packet to a job pre-processor 253, transmitting the management packet to an information manager 260, and further converting the management packet for reply transmitted from the information manager 260 into packet data; a reception buffer 254 for temporarily holding the PDL data and serving as a buffer device of a delay of processes at the post stage; a database 252 for storing the equipment information of the printing apparatus and job information to draw a print job; the job pre-processor 253 for receiving the job packet and transferring the PDL data to the reception buffer 254 by an operation code written in a header of the job packet or setting information into the database 252; the information manager 260 for receiving the management packet, rewriting the information in the database 252 in accordance with an operation code written in the management packet and the data, and forming a management packet for reply to provide the equipment information regarding the printing apparatus 250 to the host computer 200; a PDL translator 255 for performing a translating process of the PDL data and converting into a drawing object suitable to draw; a drawing buffer 256 for temporarily storing the drawing object until it is actually printed; a drawing section 257 for generating a bit map image by actually drawing the drawing object temporarily stored in the drawing buffer 256; and a printer engine 258 for receiving a bit map image generated by the drawing section 257 and printing into a media such as a paper or the like by a well-known printing technique.

According to the second print data processing method, the job packet in a data channel and the management packet in a management channel are further converted into packet data and two logic channels are constructed on one physical channel (communication medium 280), so that the transmission and reception of the print data and the managing request can be simultaneously performed. Further, by converting into the job packet which can be interpreted relatively easily as compared with the PDL by the host computer 200 and by interpreting in the job pre-processor at the front stage of the reception buffer, all of the print jobs inputted to the printing apparatus can be managed. The information managing request of the jobs from the host computer can be satisfied.

The transmission and reception of the data and the reception and reply of the information managing request can be performed in a real-time manner by the second print data processing method and the print jobs can be managed. On the contrary, however, it is a prerequisite that the job packet generator 207 and logic channel controller 206 are provided on the host computer side. However, it is necessary to individually prepare those processing sections because an installing method differs every operating system of the host computer. If those processing sections cannot be installed, unless the print by the first print data processing method so far is supported, the print is impossible.

Further, when they are connected to a network, there is a case where the connection by the host computer which corresponds to only the first print data processing method and the connection by the host computer which corresponds to only the second print data processing method mixedly exist.

In the second print data processing method, in the case where a Net Ware server or the like is provided between the host computer and the printing apparatus and a banner (headline) page has been set, the server forms print data as data of the banner page separately from the printing system of the host computer. There is, consequently, a problem such that the job packet and PDL data mixedly exist in one job and the operation of the second print data processing method cannot be guaranteed.

It is, therefore, an object of the invention to provide a printing apparatus which can discriminate whether print data has been converted into a job packet or not and can switch a processing method in accordance with the print data.

That is, to accomplish the above object, a printing apparatus of the invention comprises:

receiving means for receiving print data; and processing operation determining means for switching a first print data processing method of processing print data which is not converted into a job packet and a second print data processing method of processing print data converted into a job packet in accordance with whether the print data received by the receiving means has been converted into a job packet of a packet structure constructed by a header portion and a data portion or not.

More preferably, in the printing apparatus of the invention, the receiving means can receive both of the print data converted into a job packet and the print data which is not converted into a job packet.

Further preferably, the printing apparatus of the invention has data discriminating means for discriminating whether the print data received by the receiving means is the print data converted into a job packet or the print data which is not converted into a job packet.

Further preferably, in the printing apparatus of the invention, the print data converted into the job packet has identification information in the header portion, and the data discriminating means discriminates whether the identification information is included in the print data received by the receiving means or not, thereby discriminating whether the print data is the print data converted into the job packet or the print data which is not converted into the job packet.

Further preferably, the printing apparatus of the invention has mixture data discriminating means for discriminating whether the print data which is not converted into the job packet and the print data converted into the job packet mixedly exist in the print data received by the receiving means or not, and the processing operation determining means switches the print data processing method in accordance with the mixedly existing print data on the basis of a discrimination result of the mixture data discriminating means.

Further preferably, the printing apparatus of the invention has mixture data discriminating means for discriminating whether the print data which is not converted into the job packet and the print data converted into the job packet mixedly exist in the print data received by the receiving means or not, and the processing operation determining means switches the print data processing method in accordance with the mixedly existing print data on the basis of a discrimination result of the mixture data discriminating means.

More preferably, in the printing apparatus of the invention, in the case where it is determined by the data discriminating means that the print data received by the receiving means is not converted into the job packet and it is decided by the mixture data discriminating means that the print data converted into the job packet mixedly exists in the print data, the processing operation determining means switches in a manner such that the print data until it is decided that the print data converted into the job packet exists is processed by the first print data processing method and that the print data after it was determined that the print data converted into the job packet existed is processed by the second print data processing method.

More preferably, in the printing apparatus of the invention, in the case where the identification information is included in the print data received by the receiving means, the mixture data discriminating means determines that the print data converted into the job packet mixedly exists.

More preferably, the printing apparatus of the invention further has selecting means for enabling the operation of the first print data processing method to be forcedly selected.

More preferably, the printing apparatus of the invention further has job pre-processor means for extracting data regarding a printing process from the print data converted into the job packet and storing into data storing means.

More preferably, the printing apparatus of the invention further has information managing means for, when the management data converted into the job packet is received by the receiving means, rewriting the equipment information of the printing apparatus stored in the information storing means or the print job information or generating reply data on the basis of the equipment information stored in the information storing means.

More preferably, the printing apparatus of the invention further has channel control means for sending the data received by the receiving means to the information managing means in the case where the received data is the management data converted into the job packet and for sending the received data to the processing operation determining means in the case where it is the print data.

Although the means constructed in the printing apparatus have been mentioned above, according to the invention, the print data processing apparatus can also support a part or all of the above construction. The invention also incorporates a print control method which is accomplished by steps similar to the foregoing means and a recording medium on which a program of the similar steps has been recorded.

According to the invention, the print data received by the receiving means and the environmental set data are distributed by the first channel control means to the processing operation determining means via a data channel in case of the print data converted into the job packet and the print data which is not converted into the job packet and are distributed to the information managing means via a management channel in case of the environmental set data converted into the job packet. The processing operation determining means automatically switches the operation of the printing system on the basis of the print data of the data channel in accordance with a discrimination result about whether the print data is the print data converted into the job packet or not. Even in the case where the print data converted into the job packet and the print data which is not converted into the job packet mixedly exist in the print data, the processing operation determining means switches the operation of the printing system in accordance with the mixedly existing print data. That is, any one of the print data described by an ordinary page description language and the print data converted into the job packet can be selectively processed by the processing operation determining means. Even in a printing system which does not have job packet generating means and second channel control means, it is possible to cope with the printing process.

According to the invention, by further having selecting means for enabling the first print data processing method of processing the print data described by the page description language to be forcedly selected, an instruction from the operator can be preferentially reflected irrespective of an automatic recognition by compatible operation determining means. Thus, even in the case where although the host computer presumed the first print data processing method, the printing apparatus judges the data as data of the second print data processing method and processes it, a process can be designated as print data in the first print data processing method.

The above and other objects and features of the present invention will become apparent from the following detailed description and the appended claims with reference to the accompanying drawings.

BRIEF DESCRIPTION OF THE DRAWINGS

FIG. 4 is a diagram for explaining a packet construction of a job packet;

FIG. 7 is a diagram showing a display example of an operation panel;

DETAILED DESCRIPTION OF THE PREFERRED EMBODIMENTS

Preferred embodiments of the invention will now be described hereinbelow with reference to the drawings.

First Embodiment

Figure 1:
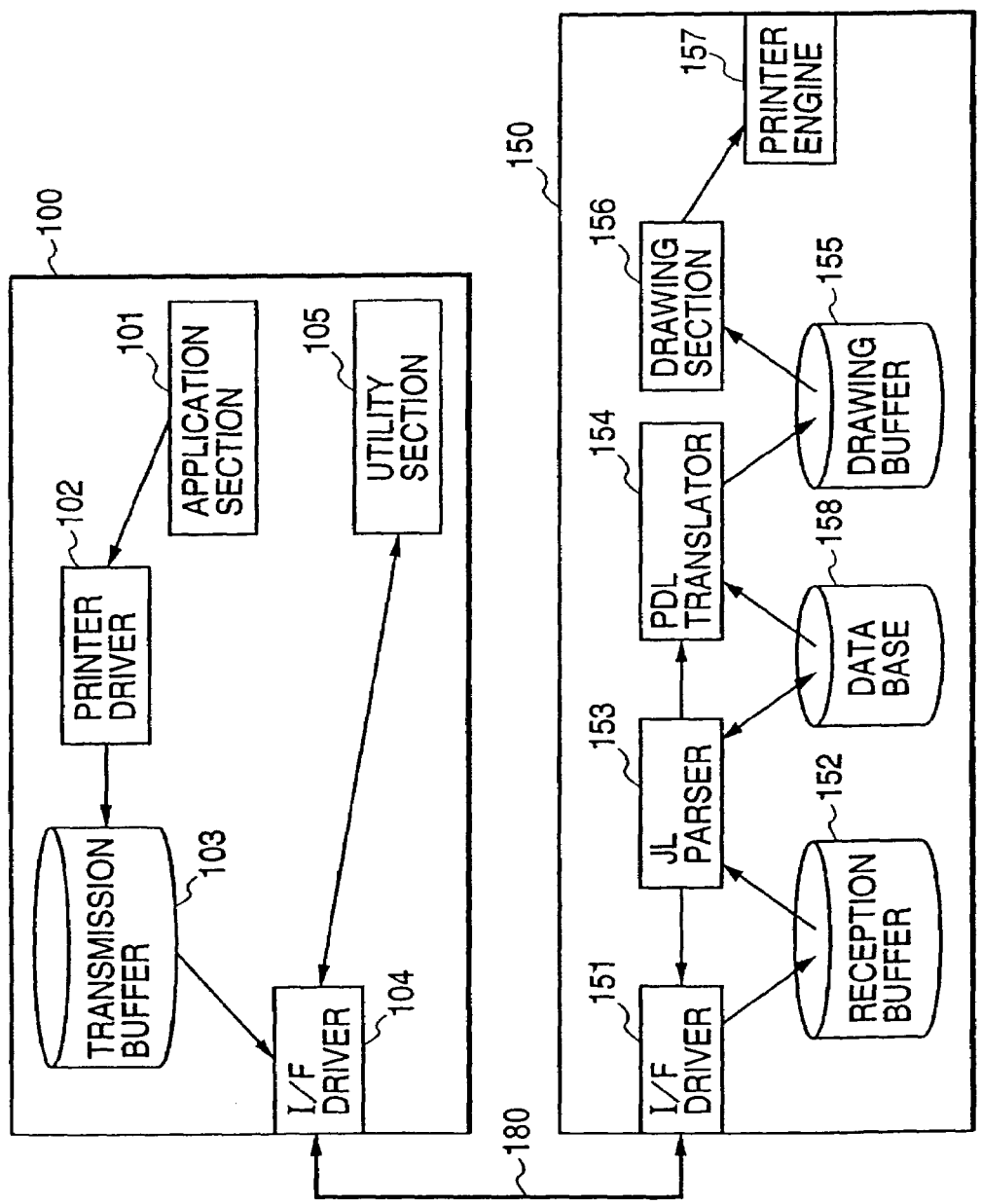
FIG. 1 is a diagram for explaining a construction of a printing system according to a first print data processing method.
Figure 2:
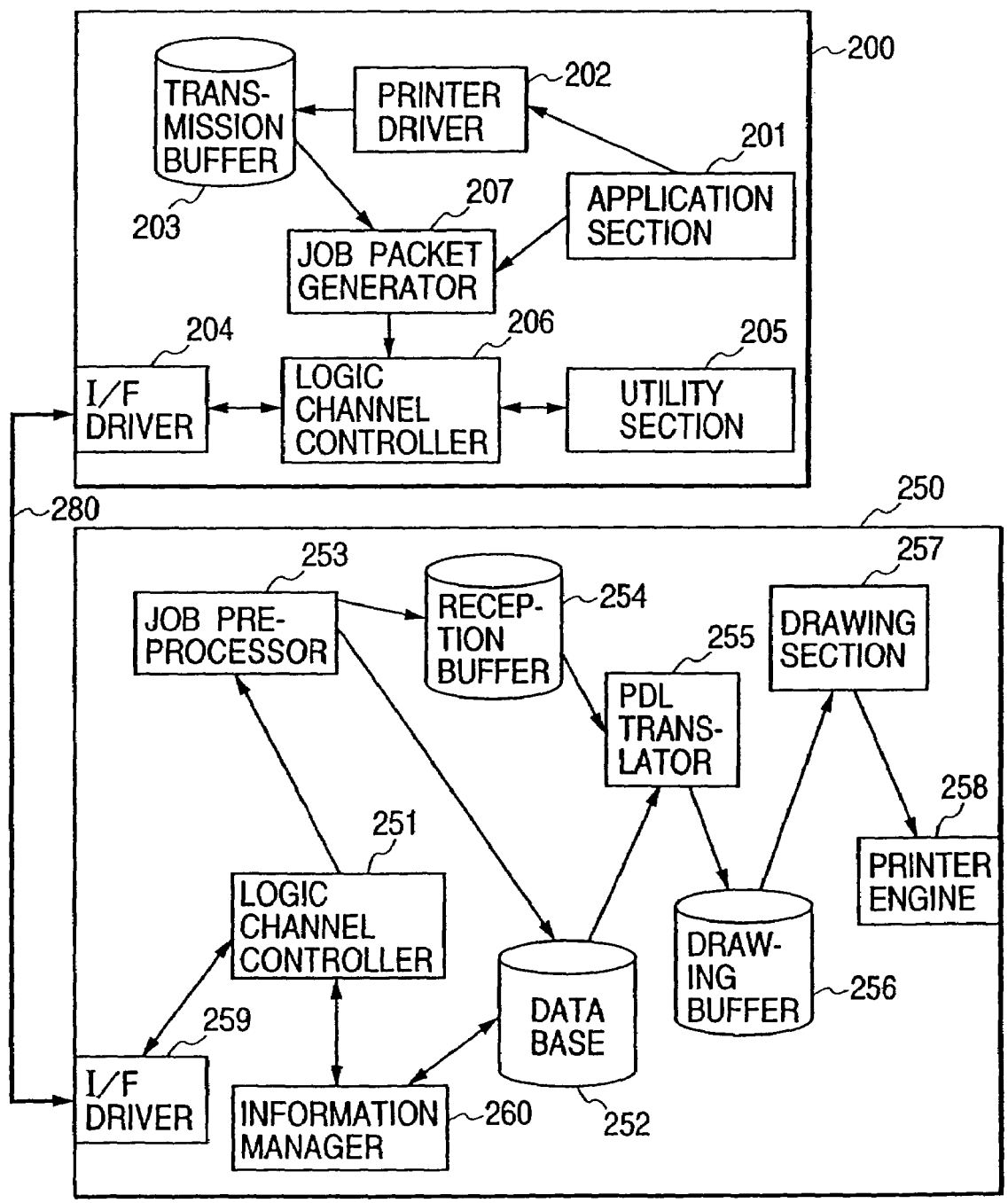
FIG. 2 is a diagram for explaining a construction of a printing system according to a second print data processing method obtained by improving the printing system according to the first print data processing method.
Figure 3:
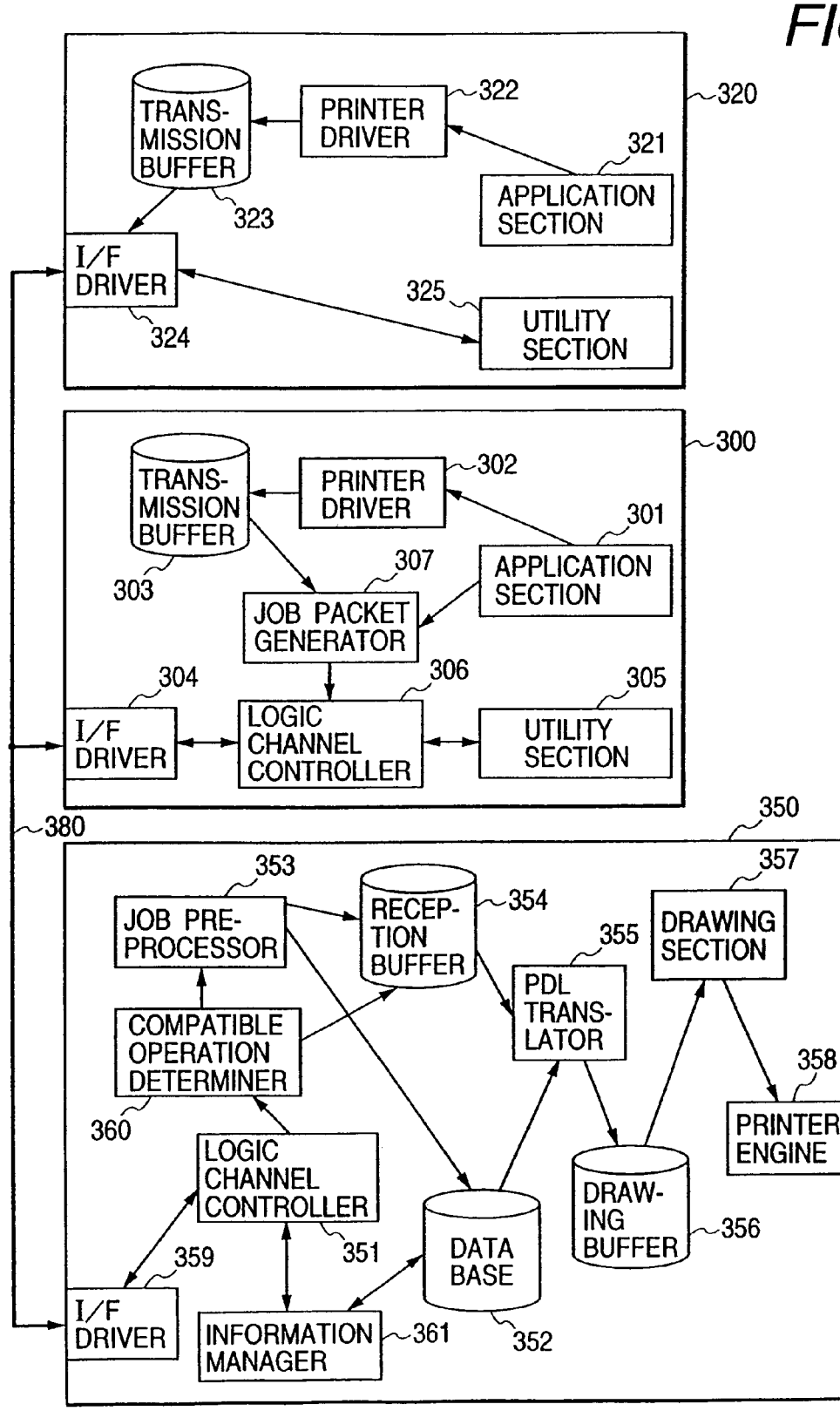
FIG. 3 is a diagram for explaining a construction of the first embodiment.

FIG. 3 is a diagram showing a construction of the first embodiment of the invention.

In FIG. 3, reference numeral 320 denotes a host computer (functions as first print data generating means) presuming the first print data processing method; 300 a host computer (functions as second print data generating means) presuming the second print data processing method; 350 a printing apparatus; and 380 a predetermined communication medium for connecting the host computer 300 and printing apparatus 350.

In this connecting form, the printing apparatus 350 does not become aware of whether the host computer which sent the print data is the host computer 300 or 320.

Further, the host computer 320 presumes the first print data processing method and is constructed by: an application section 321 for providing a graphic user interface to the user and generating image data adapted to a purpose of the user; a printer driver 322 for converting the image data generated by the application section 321 into page description language (hereinafter, abbreviated to PDL) data which can be printed by the printing apparatus 350; a transmission buffer 323 for temporarily storing the PDL data formed by the printer driver 322; an I/F driver 324 for transmitting the PDL data stored in the transmission buffer to the printing apparatus 350 and transmitting an environmental setting of the printing apparatus 350; and a utility section 325 for changing the environmental setting of the printing apparatus 350 in accordance with a demand of the user.

Further, the host computer 300 presumes the second print data processing method and is constructed by: an application section 301 for providing a graphic user interface to the user and generating image data adapted to a purpose of the user; a printer driver 302 for converting the image data generated by the application section 301 into page description language (hereinafter, abbreviated to PDL) data which can be printed by the printing apparatus 350; a transmission buffer 303 for temporarily storing the PDL data formed by the printer driver 302; a job packet generator 307 for generating a job packet from the PDL data stored in the transmission buffer 303; a utility section 305 for generating a management packet to obtain the information of the printing apparatus 350 and provide it to the graphic user interface and change the environmental setting of the printing apparatus 350 in accordance with a demand of the user; a logic channel controller 306 for setting a logic channel to receive the job packet from the job packet generator 307 to a data channel, setting a logic channel to transmit and receive a management packet to/from the utility section 305 to a management channel, and further converting the job packet and the management packet into packet data in order to convert those two logic channels into one physical channel for transmitting and receiving data to/from the printing apparatus 350; and an I/F driver 304 for transmitting and receiving the job packet and management packet which were further converted to the packet data by the logic channel controller 306 to/from the printing apparatus 350. The PDL data converted to the job packet is referred to as a job packet and the environmental set data converted to the job packet is referred to as a management packet.

The printing apparatus 350 is constructed by: an I/F driver 359 for performing the reception of the print data and the environmental set data transmitted from the host computers 300 and 320, the transmission of equipment information of the printing apparatus 350, and the like; a logic channel controller 351 for, when the data received by the I/F driver 359 is the packet data from the host computer 300, dividing the packet data into the job packet and the management packet and sending them to a compatible operation determiner 360 and an information manager 361 via the data channel and the management channel, respectively, and for sending the received data to the compatible operation determiner 360 when it is the data from the host computer 320; a reception buffer 354 for temporarily holding the PDL data and serving as a buffer device of a delay of processes at the post stage; a database 352 for storing a database of equipment of the printing apparatus and job information to draw a print job; the compatible operation determiner 360 for checking the print data received from the logic channel controller and switching the operations of the first print data processing method and the second print data processing method in accordance with a discrimination result about whether the print data is the job packet or not; a job pre-processor 353 for receiving the job packet from the compatible operation determiner 360 and transferring the PDL data to the reception buffer 354 by an operation code written in a header of the job packet or setting information into the database 352; the information manager 361 for receiving the management packet sent to the management channel, rewriting the information in the database 352 in accordance with an operation code written in the management packet and the data, and forming a management packet for reply to provide the information regarding the printing apparatus 350 to the host computer 300; a PDL translator 355 for performing a translating process of the PDL data and converting into a drawing object suitable to draw; a drawing buffer 356 for temporarily storing the drawing object until it is actually printed; a drawing section 357 for generating a bit map image by actually drawing the drawing object temporarily stored in the drawing buffer 356; and a printer engine 358 for receiving a bit map image generated by the drawing section 357 and printing into a media such as a paper or the like by a well-known printing technique. The reception buffer 354 and database 352 function as data holding means (predetermined database).

A structure of a job protocol will now be described.

The job protocol is a protocol constructed by the job packet which is generated by the job packet generator 307 of the host computer 300 and is standardized so that the recognition of the start of the job and the setting of job attributes can be easily performed in the job pre-processor of the printing apparatus 350. A communication is performed by a request due to a request packet of the job packet and a reply by a reply packet which will be explained hereinlater.

FIG. 4 is a table showing a packet structure of the job packet.

An axis of ordinate denotes a byte and an axis of abscissa indicates a bit of each byte.

In the diagram, the operation code of the zeroth and first bytes indicates an ID of a length of 2 bytes showing a function of the packet. In the job packet, the following values can be taken.

0x0201 job start operation

0x0202 job attribute set operation

0x0204 PDL data transmission operation

0x0205 job end operation where, the above values are expressed by the hexadecimal notation and one byte is expressed by two digits (the expression of "0x" usually indicates the hexadecimal notation).

The block number of the second and third bytes is a number which is used to make a correspondence between the request and the reply in case of requesting a reply from the side which transmitted the job packet.

For example, if an error packet of the block No.=2 is returned when the job packets of the block Nos.=1, 2, 3 are continuously transmitted, when a reply is returned, the transmission side can specify that an error occurred in the job packet sent at the second time.

The parameter length of the fourth and fifth bytes relates to an area showing a byte length of the data portion and can show 0 to 64 kbytes.

The sixth and seventh bytes relate to an area showing various flags of the job packet and the following values are shown.

Error Flag:

When this value is equal to 1, it means that some error occurred in the printing apparatus. This flag is added to a reply packet that is sent from the printing apparatus to the host computer.

Notice Flag:

When this value is equal to 1, it means that a fact that the printing apparatus has some notice item is notified to the host computer instead of a reply to the request packet from the host computer.

Continuation Flag:

When this value is equal to 1, it means that since all of the data cannot be inputted to the data portion, the remaining data is sent in the next job packet. For the next job packet, the same operation code as that of the previous packet has to be set.

Reply Request:

"1" is set in the case where a reply packet is necessary from the host computer to the printing apparatus. When this value is equal to 0, the request packet does not reply in the case where it is normally processed. When an error occurs in the printing apparatus, a reply packet in which the error flag is set to 1 is always transmitted irrespective of 0/1 of the reply request.

A user ID of the eighth and ninth bytes and a password of the tenth and eleventh bytes relate to areas which are used for authentication when a security-like limitation is provided to the operation which can be performed in the request packet. They do not exert an influence on the embodiment.

The twelfth and subsequent bytes relate to an area in which the data corresponding to the operation code is stored.

In case of a job start operation and a job end operation, the data does not depend on them.

In case of a job attribute set operation, a job attribute ID and a job attribute value to be set are set. The job attribute ID shows attributes regarding the job or an identifier corresponding to the environment. An ID corresponding to the attribute of the job that is specified by ISO-10175 (DPA) has previously been allocated. The representative job attributes are as follows.

| | |
|---|---|
| 0x0101 | job name |
| 0x0103 | job owner name |
| 0x016a | job size |

In case of a PDL data transmitting operation, the PDL data is inputted to the data portion. Since the data of one job packet has up to the maximum size that can be stored into the parameter length, the data of up to 64 kbytes can be stored and the further remaining data is divided into a plurality of PDL data transmitting operation and transmitted. In this case, 1 is set to the continuation flag.

In the above job packet structure, when the print data is transferred, a procedure to certainly transmit the job start operation is used. The job start operation can be specified such that the operation code is set to 0x0201, the packet length is set to 12 bytes, only the reply request is equal to 0 or 1 in the flag area, and the other flags are equal to 0. Therefore, when the print data is received, if the header of the print data coincides with the above conditions, the printing apparatus 350 determines that the operation is the job start operation of the job packet and can operate as a second print data processing method. On the contrary, when the printing apparatus 350 receives the print data, if the header of the print data does not coincide with the above conditions, since this means that the job packet is not received, the printing apparatus can operate as a first print data processing method that is compatible to the conventional one. The above determination is performed by the compatible operation determiner 360.

Although the management packet is expressed by a packet structure of FIG. 4 in a manner similar to the job packet, the values of the operation codes differ.

Figure 5:
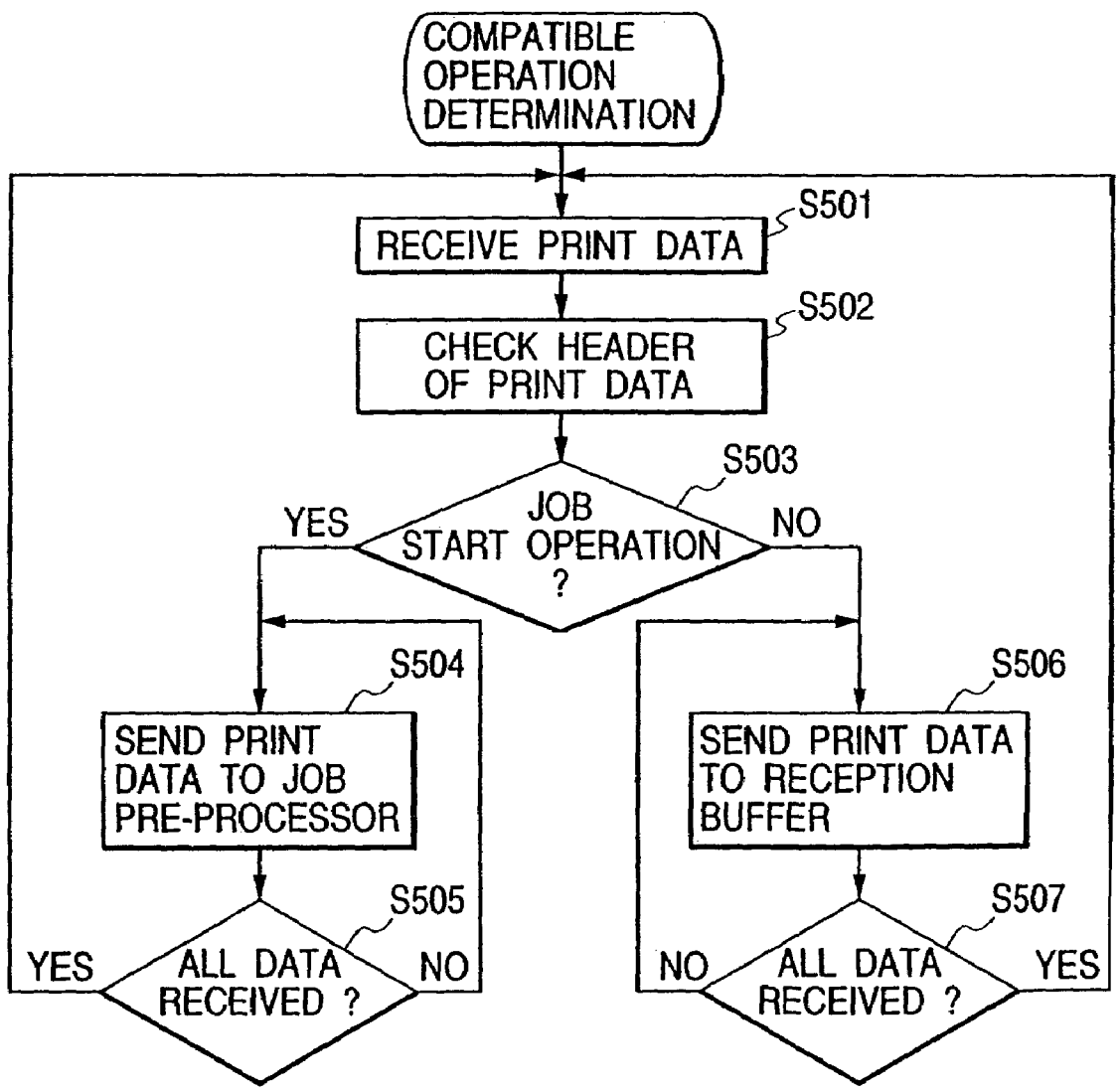
FIG. 5 is a flowchart for explaining the operation of a compatible operation determiner in the first embodiment.

FIG. 5 is a flowchart for explaining the operation of the compatible operation determiner 360.

The compatible operation determiner starts the operation upon activation of the printing apparatus and continues the process until the power source is shut off.

In FIG. 5, the print data is received in step S501. The print data is generated from the host computer 300 or 320 and is sent via the logic channel controller 351.

When the print data is received, a header of the print data is checked in step S502 and is compared to see if it coincides with a packet structure of the operation code or the like of the job start operation.

In step S503, if it is recognized that the header coincides with the job start operation (YES in step S503), the print data is sent to the job pre-processor 353 in step S504.

Since the print data is sent to the job pre-processor 353, the print job executes the operation as a second print data processing method.

Since the print data converted to the job packet has size information showing the size of the relevant job packet in the header portion, a delimiter of the print data converted into the job packet is discriminated from the size information. In step S505, a check is made to see if the reception has been completed up to the delimiter of the print data. If it is not completed (NO in step S505), the processing routine is returned to step S504. If it is completed (YES in S505), the processing routine is returned to first step S501 in the compatible operation determiner. The next print data is checked.

If it is recognized in step S503 that the header does not coincide with the job start operation (NO in S503), the print data is sent to the reception buffer 354 in step S506. Since it is not transmitted through the job pre-processor, the relevant job performs the operation as a first print data processing method.

When the reception of the print data is not completed in step S507 (NO in S507), the operation to return to step S506 is continued until the received print data is interrupted. When the received print data is interrupted and the reception of the print data is completed (YES in S507), the processing routine is returned to first step S501 in the compatible operation determiner and the next print data is checked.

As described above, according to the embodiment, the print data received by the receiving means is distributed by the channel control means to the processing operation determining means via the data channel in case of the print data converted into the job packet and the print data which is not converted into a job packet and is distributed to the information managing means via the management channel in case of the environmental set data (management packet) converted into the job packet. The processing operation determining means switches the operation of the printing system in accordance with whether the print data is the print data converted into the job packet or not on the basis of the data received from the data channel.

That is, any one of the print data described by the ordinary page description language and the print data converted into the job packet can be selectively processed by the processing operation determining means. Even in case of a printing system which does not have the job packet generating means and the logic channel control means, it is possible to cope with the printing process.

By further converting the job packet and the management packet into the packet data and constructing two logic channels by one physical channel, the transmission and reception of the print data and the managing request can be simultaneously performed. The print data is converted into the job packet which can be interpreted relatively easily as compared with the PDL by the host computer and the job packet is interpreted by the job pre-processor means at the front stage of the reception buffer, so that all of the print jobs received by the printing apparatus can be managed and the information managing request of the job from the host computer can be satisfied.

Second Embodiment

In the first embodiment, the discrimination about the first and second print data processing methods has been made by the job start operation of the job packet. However, there is some possibility that the print data which is transmitted by the first print data processing method also becomes the same data as that of the job data operation of the job packet. In this case, there is a possibility that although the operation by the first print data processing method is expected, the data passes through the job pre-processor and the print is not normally performed. The second embodiment shows an example for preferably performing the print in such a case.

Figure 6:
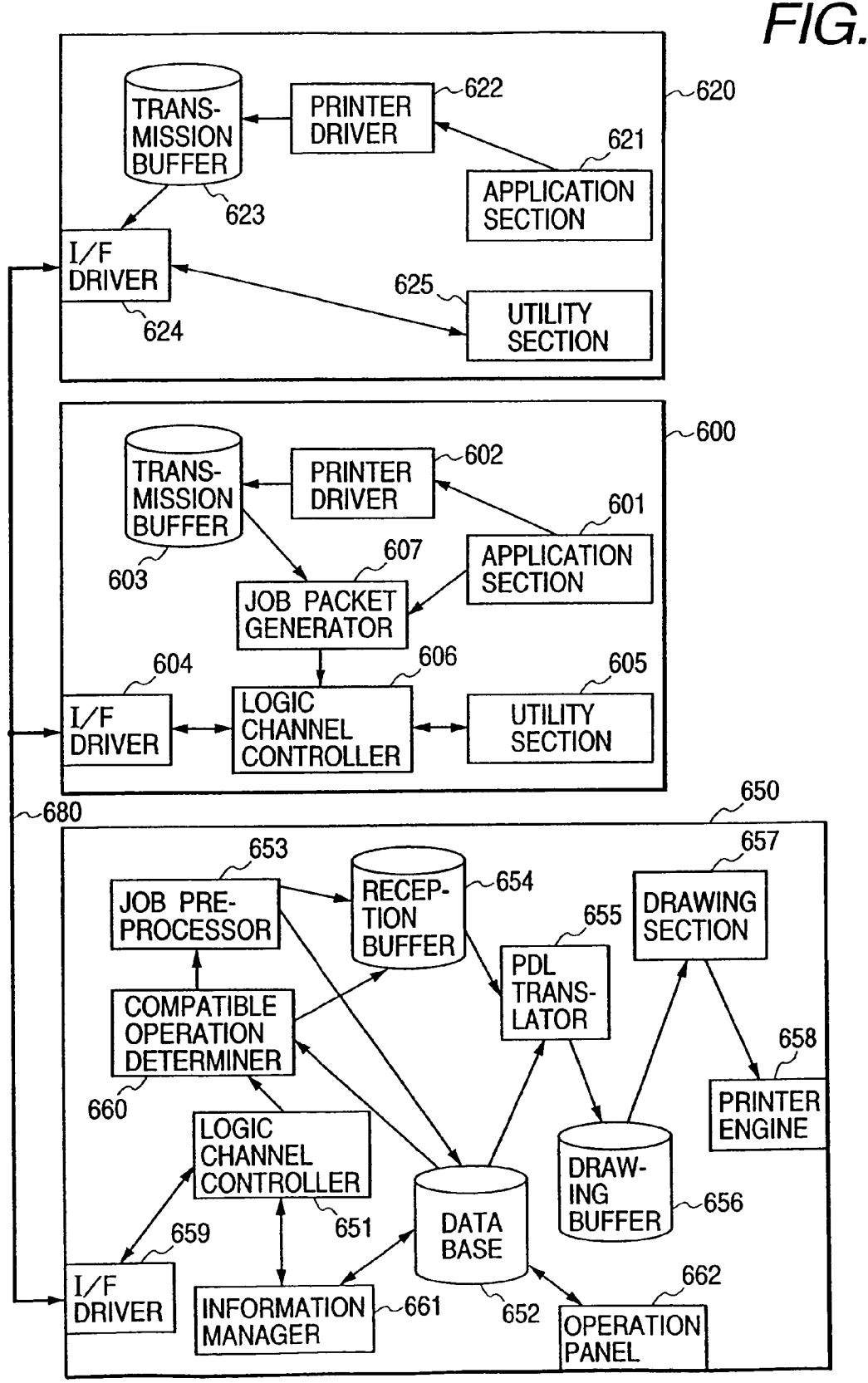
FIG. 6 is a constructional diagram for explaining a construction of the second embodiment.

FIG. 6 is a diagram showing a construction of the second embodiment of the invention. Since an outline of the second embodiment is similar to that of FIG. 3, only portions newly added for the second embodiment will be described. Reference numeral 662 denotes an operation panel for allowing the user to display and set an environment of the printing apparatus. The operation panel is connected to a database 652 and the set contents of the operation panel are reflected to the database 652.

In the second embodiment, the user intends to print by the first print data processing method. However, to avoid a possibility of erroneous operation such that the print is performed by the second print data processing method, selecting means for designating whether the first print data processing method is forcedly used or not on the operation panel is provided.

Figure 7:
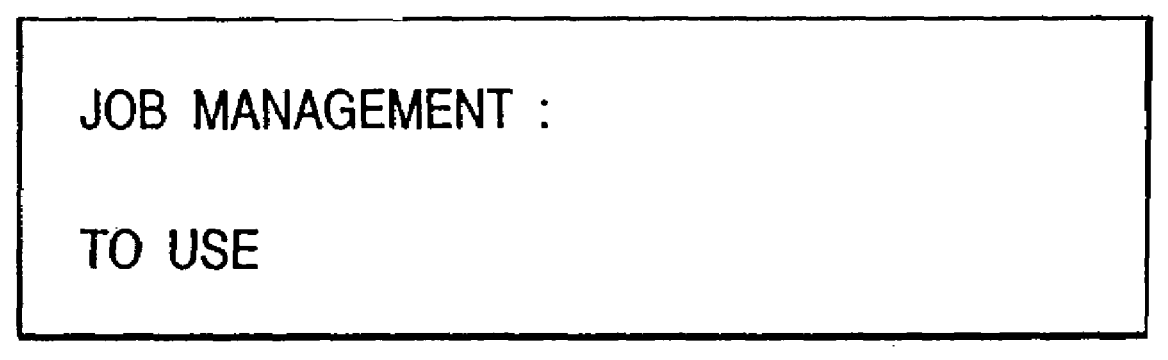

FIG. 7 shows an example of the setting of the operation panel. "Job management" on the first line is a keyword indicative of a set item about whether the second print data processing method is used or not. The second line shows a selection item about whether the second print data processing method is used or not and "To use" or "Not to use" can be selected. In case of "To use", this means that the printing process to decide,which one of the first and second print data processing methods is used is "To use (is used)" by the discriminating process of the compatible operation determiner shown in the first embodiment. In case of "Not to use", this means that the first print data processing method is forcedly used.

The item set value of "Job management" set in the database is obtained by the compatible operation determiner 660 and the operation is switched.

Figure 8:
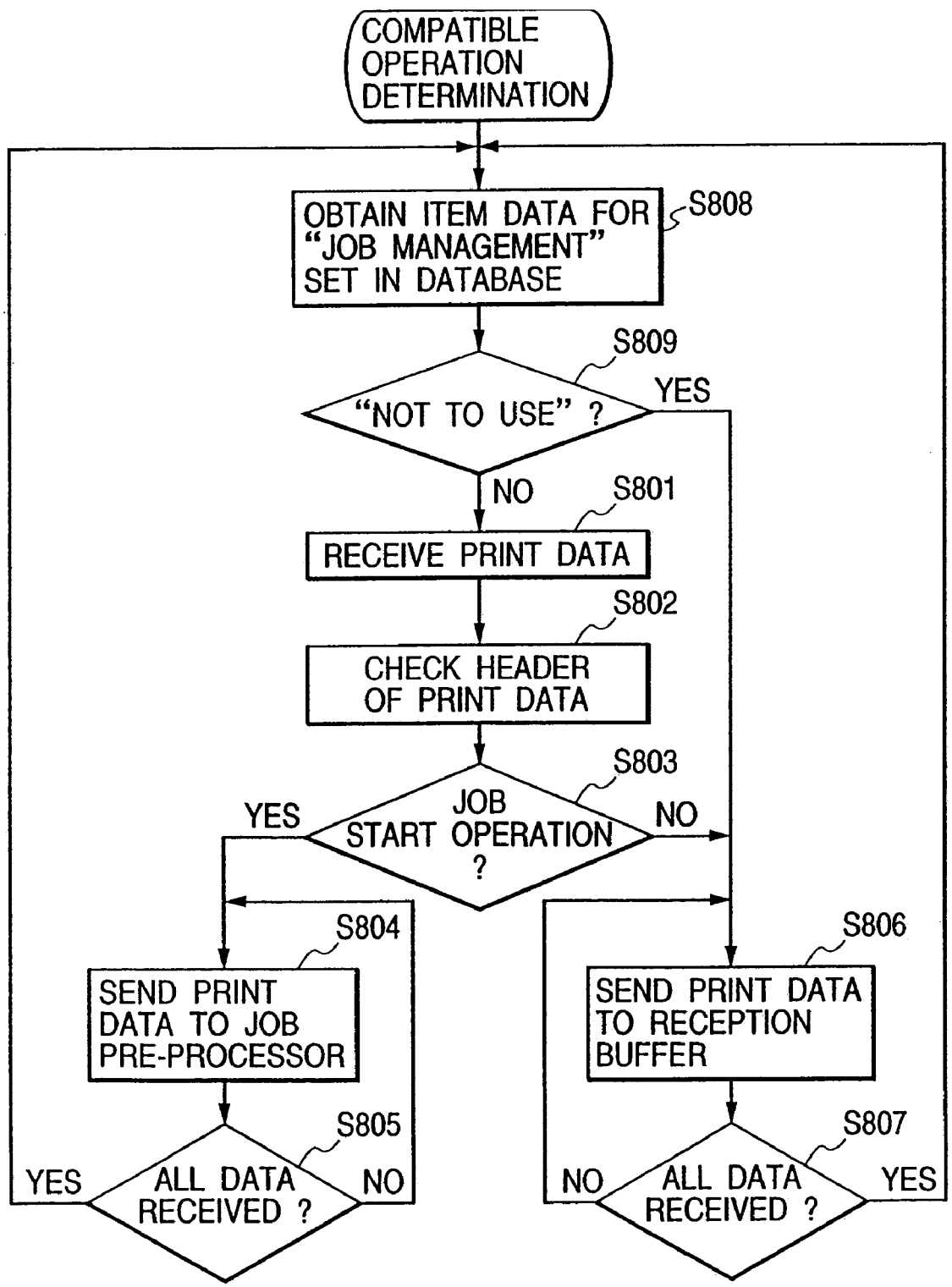
FIG. 8 is a flowchart for explaining the operation of a compatible operation determiner in the second embodiment.

FIG. 8 is a flowchart for explaining the operation of the compatible operation determiner 660.

Only portions different from those in FIG. 5 of the first embodiment will be explained. First in step S808, the compatible operation determiner obtains the set item value of "Job management" from the database 652. In step S809, in the case where the set value indicates "Not to use" (the second print data processing method is not used but only the first print data processing method is used), a process in step S806 for unconditionally sending the print data to the reception buffer without discriminating whether the print data is the data converted into the job packet or not is executed. Thus, the printing operation according to the use form can be selected on the basis of an instruction from the operator.

As described above, according to the embodiment, by further providing the selecting means for enabling the first print data processing method by the print data which is not converted into the job packet to be forcedly selected, the instruction from the operator can be preferentially reflected irrespective of the automatic recognition by the compatible operation determining means.

Thus, even in the case where although the host computer presumed the first print data processing method, it is decided in the compatible operation determiner that the print data is the data based on the second print data processing method and is processed, the process as print data in the first print data processing method can be designated.

Third Embodiment

According to the first embodiment, if the processing method of the operation is once determined to be the first print data processing method or the second print data processing method by the compatible operation determiner, the printing system is not switched until the reception of the print data is completed.

The third embodiment shows an example of processing means for normally printing in the case where the print data of the first print data processing method and the print data of the second print data processing method are mixedly sent into the print data.

Figure 9:
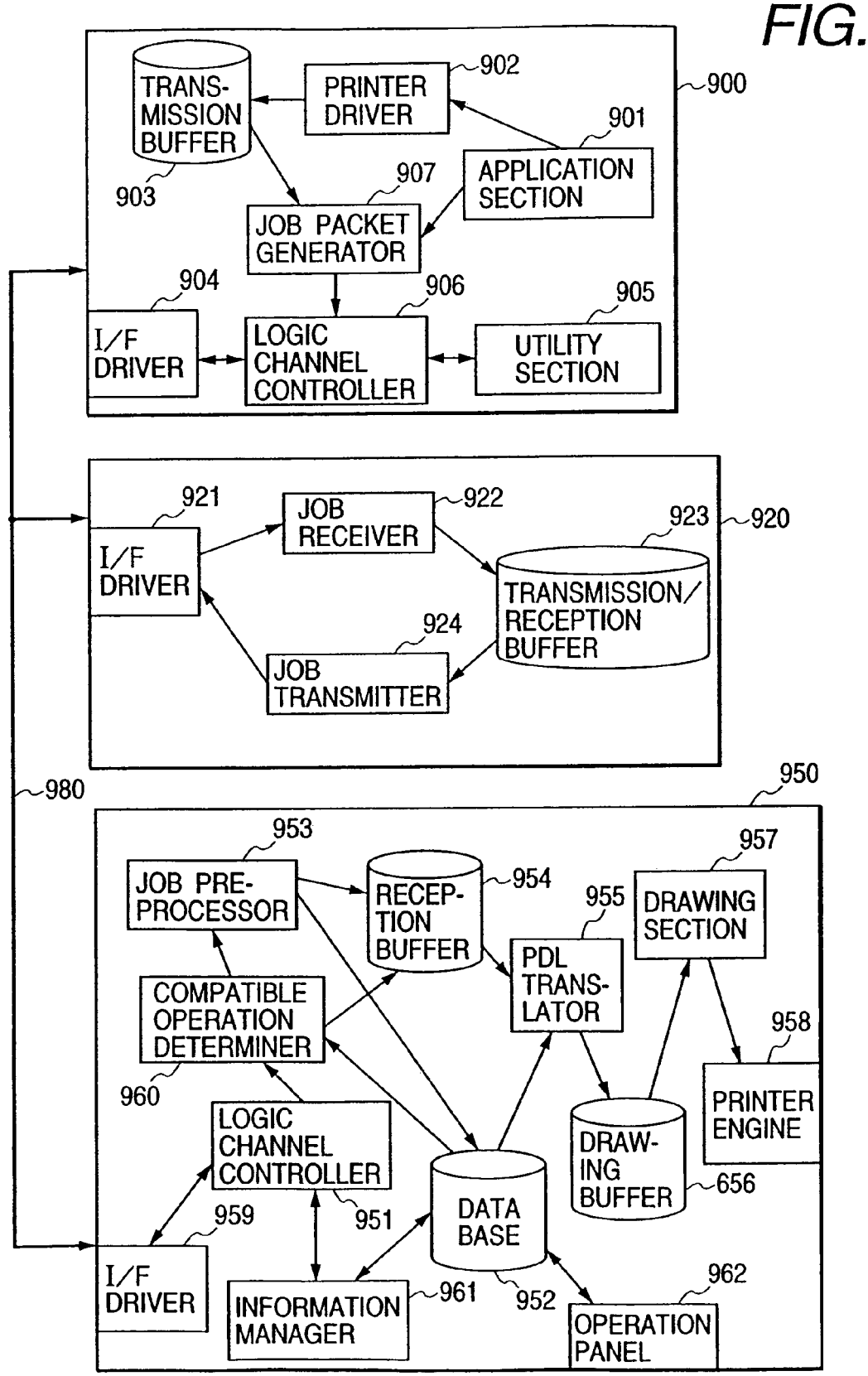
FIG. 9 is a constructional diagram for explaining a construction of the third embodiment.

FIG. 9 is a diagram showing a construction of a printing system of the third embodiment.

In FIG. 9, reference numeral 900 denotes a host computer which presumes the second print data processing method; 920 a print server; 950 a printing apparatus; and 980 a predetermined communication medium for connecting the host computer 900, print server 920, and printing apparatus 950.

The host computer 900 is similar to the host computer 300 in the first embodiment.

The print server 920 is an apparatus for temporarily receiving a printing request from the host computer 900 and transferring it to the printing apparatus 950 and has a role to properly sequentially send printing requests from a plurality of host computers to the printing apparatus 950. The print server 920 is an existing apparatus and "Windows NT", "Net Ware", or the like is used.

The print server 920 is constructed by: an I/F driver 921 for transmitting and receiving data to/from the network; a job receiver 922 for receiving the printing request from the host computer 900 and sending the data to a transmission/reception buffer; the transmission/reception buffer 923 for temporarily storing the data sent from the job receiver 922; and a job transmitter 924 for transmitting the print data to the printing apparatus 950 via the I/F driver 921 in response to a request from the printing apparatus 950 when the print data exists in the transmission/reception buffer 923.

The print server 920 can be set so as to add a banner page to the print data. In this case, the job transmitter 924 adds banner page data to the header of the print data. The banner page data is simple text data comprising an alphanumeric code and a new-line character.

As for the job packet generated by the host computer 900, the banner page data is added to the header of the job packet when it passes through the print server 920. In the first embodiment, since the banner page data has been added, the job start operation cannot be recognized in a compatible operation determiner 960, the apparatus operates as a first print data processing method, and an erroneous operation is performed.

To prevent the erroneous operation, the compatible operation determiner 960 in the third embodiment is improved.

Although the printing apparatus 950 is similar to the printing apparatus 350 in FIG. 3 in the first embodiment, the operation of the compatible operation determiner 960 differs. The operation of the compatible operation determiner 960 will now be described hereinbelow.

Figure 10:
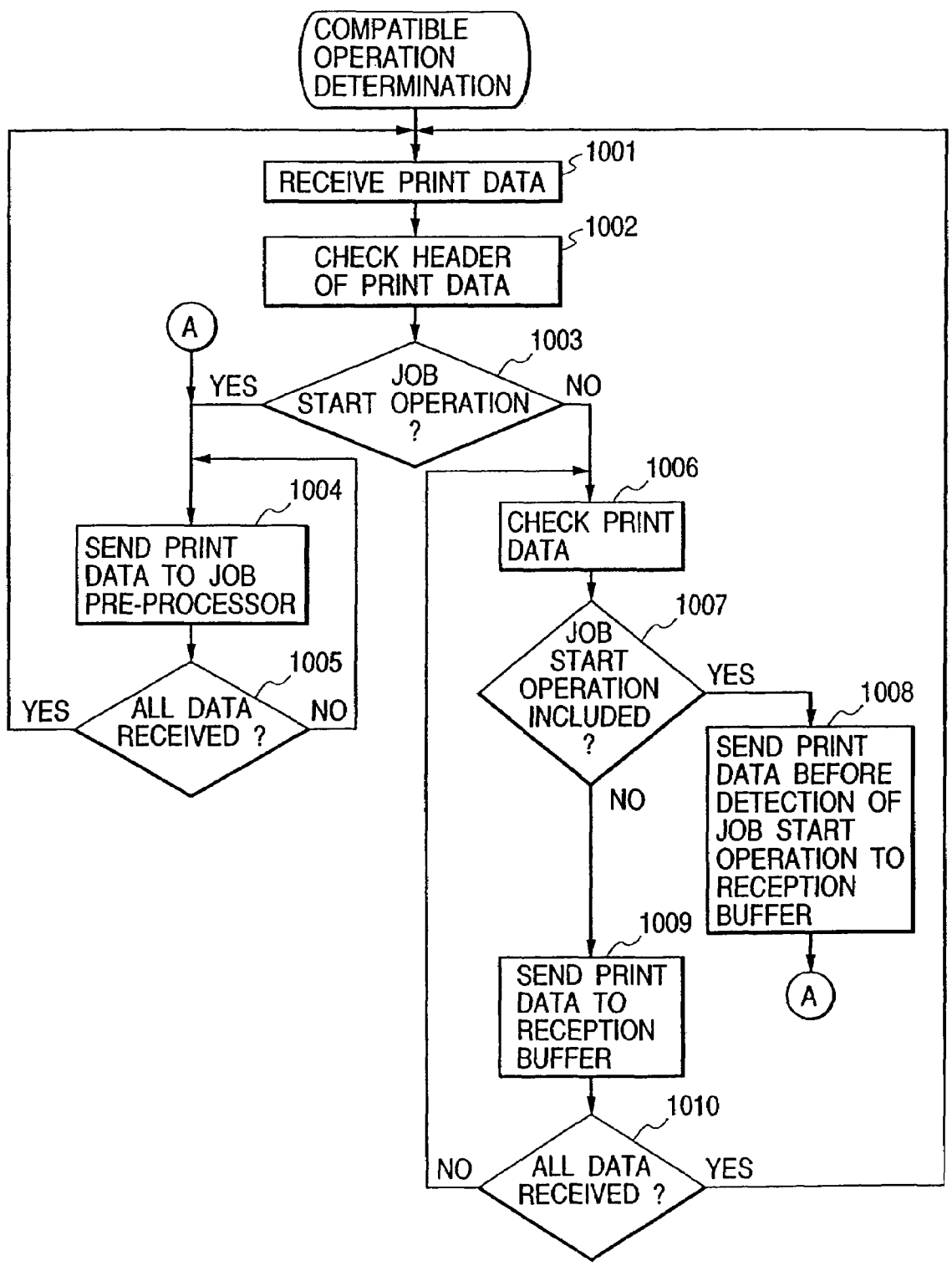
FIG. 10 is a flowchart for explaining the operation of a compatible operation determiner in the third embodiment.

FIG. 10 is a flowchart for explaining the operation of the compatible operation determiner 960.

In FIG. 10, the print data is received in step 1001. The print data is generated from the host computer 900 and is sent via a logic channel controller 951. When the print data is received, in step 1002, the header of the print data is checked and is compared to see if it coincides with a packet structure of the job start operation.

In step 1003, if it is recognized that the header coincides with the job start operation (Yes in 1003), the processing routine advances to step 1004 and the print data is sent to a job pre-processor 953.

When the print data is supplied to the job pre-processor 953, the print data is printed by the second print data processing method.

Since the print data converted into the job packet has size information indicative of the size of the job packet in the header portion, a delimiter of the print data converted into the job packet is discriminated from the size information. A check is made in step 1005 to see if the reception of all of the print data up to the delimiter has been completed. If it is not yet completed (No—1005), the processing routine is returned to step 1004. If the reception is completed (Yes—1005), the processing routine is returned to first step 1001 of the compatible operation determiner and the next print data is checked.

When it is recognized in step 1003 that the header of the print data does not coincide with the job start operation (No—1003), the contents in the received print data are sequentially checked in step 1006. A check is made in step 1007 to see if the job start operation has been included. If it is included (Yes—1007), the print data is sent to the reception buffer until the job start operation is found in step 1008. As for the print data after the job start operation was found, the processing routine advances to step 1004 and the operation by the second print data processing method is started.

When it is determined in step 1007 that the job start operation is not included in the print data (No—1007), all of the reception data is sent to the reception buffer in step 1009. A check is made in step 1010 to see if all of the data has been received until the received print data is interrupted. If it is received (Yes—1010), the processing routine is returned to the initial state in step 1001. When all of the data is not yet received (No—1010), the processing routine is returned to step 1006 until all of the data is received. The print data is again checked.

As mentioned above, when it is decided in step 1003 that the print data is the data which is not converted into the job packet, processing steps 1006, 1007, and 1008 are needed. However, if it is decided in step 1003 that the print data is the data converted into the job packet, since the size of the job packet can be discriminated by a parameter length of the header of the job packet, the delimiter of the data which is specified by this size, namely, the completion of the reception of the job packet can be accurately discriminated in step 1005. The processing routine is returned to step 1001 and the print data after completion of the reception of the job packet is checked. Therefore, the processing steps like 1006, 1007, and 1008 to check the contents in the print data are unnecessary.

As described above, according to the embodiment, in the case where the print data by the first print data processing method and the print data by the second print data processing method are mixedly sent into the print data, by switching the print data processing means in accordance with the print data, the data can be normally printed.

In addition to the host computer which presumed the second print data processing method, a host computer which presumes the first print data processing method can be also connected by the predetermined communication medium 980. In case of such a host computer, since the first print data processing method was presumed for the print data, even if the banner page data is added by the print server 920, the operation is performed as a first print data processing method, so that the apparatus normally operates.

Even in the print data that is transmitted by the first print data processing method, there is some possibility that it is the same data as that of the job start operation of the job packet. In such a case, there is a case where although the operation by the first print data processing method is expected, the operation as a second print data processing method is started. To preferably perform the print in this case, an operation panel 962 which can forcedly select the printing system can be also added in a manner similar to the second embodiment.

As an example of the operation of the printing system in this case, in the flowchart of FIG. 10, before the operation in step 1001, operations similar to those in steps S808, S809, S806, and S807 in the flowchart of FIG. 8 are added. That is, the following operations are added. The set item value of "Job management" is obtained from the database 952. When the set value indicates "Not to use" (the second print data processing method is not used but only the first print data processing method is used), a process to unconditionally send the print data to the reception buffer is performed without checking whether the print data is the data converted into the job packet or not. When the set value shows "To use", the processing routine advances to step 1001 and subsequent steps and the print data is checked.

Other Embodiments

The invention can be applied to a system constructed by a plurality of equipment (for example, a host computer, an interface device, a reader, a printer, and the like) or can be also applied to an apparatus comprising one equipment (for instance, a copying apparatus, a facsimile apparatus, or the like).

It will be obviously understood that the object of the invention is accomplished by a method whereby a storing medium in which program codes of software to realize the functions of the foregoing embodiments have been recorded is supplied to a system or an apparatus and a computer (or a CPU or an MPU) of the system or apparatus reads out and executes the program codes stored in the storing medium.

In this case, the program codes themselves read out from the storing medium realize the functions of the embodiments mentioned above and the storing medium in which the program codes have been stored constructs the invention.

As a storing medium to supply the program codes, for example, it is possible to use any one of a floppy disk, a hard disk, an optical disk, a magnetooptic disk, a CD-ROM, a CD-R, a magnetic tape, a non-volatile memory card, an ROM, and the like.

It will be obviously understood that the invention incorporates not only a case where by executing read-out program codes by a computer, the functions of the embodiments mentioned above are realized but also a case where the OS (operating system) or the like which is operating on the computer executes a part or all of the actual processes on the basis of instructions of the program codes and the functions of the embodiments mentioned above are realized by those processes.

Further, it will be obviously understood that the invention also incorporates a case where the program codes read out from the storing medium are written into a memory provided for a function expanding board inserted into a computer or a function expanding unit connected to the computer and, after that, a CPU or the like provided for the function expanding board or function expanding unit executes a part or all of the actual processes on the basis of instructions of the program codes and the functions of the embodiments mentioned above are realized by those processes.

Figure 11:
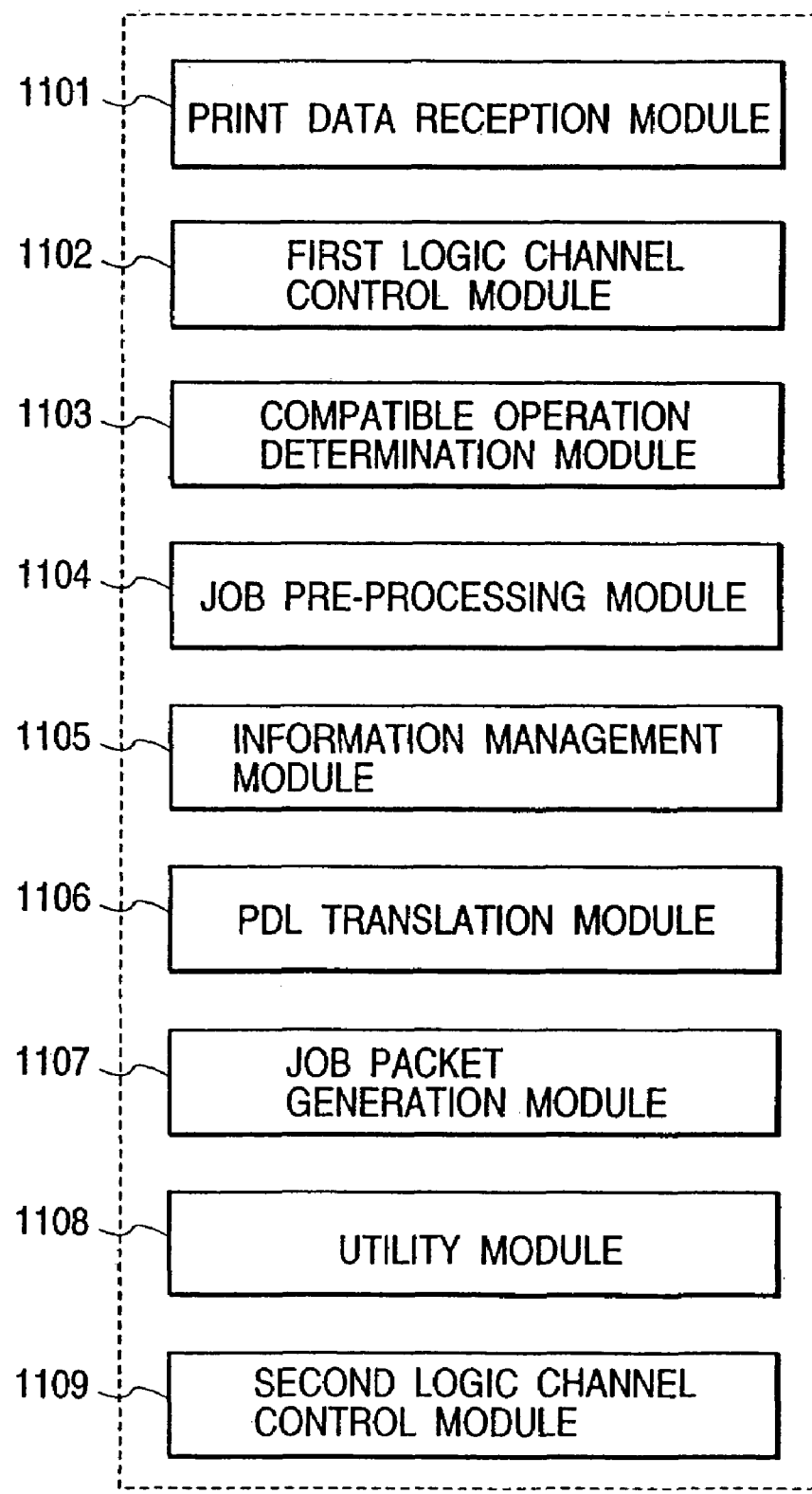
FIG. 11 is a diagram showing a memory map on a recording medium.

In case of applying the invention to the storing medium, the program codes corresponding to the flowcharts described before are stored into the storing medium. However, now simply explaining, each module shown in a memory map example of FIG. 11 is stored into the storing medium. It is sufficient to store the program codes of at least the following respective modules into the storing medium: namely, "Print data reception module 1101"; "First logic channel control module 1102"; "Compatible operation determination module 1103"; "Job pre-processing module 1104"; "Information management module 1105"; "PDL translation module 1106"; "Job packet generation module 1107"; "Utility module 1108"; and "Second logic channel control module 1109".

<Explanation of Outline of Printing Apparatus>

A laser beam printer can be also used as a printing apparatus 350.

Figure 12:
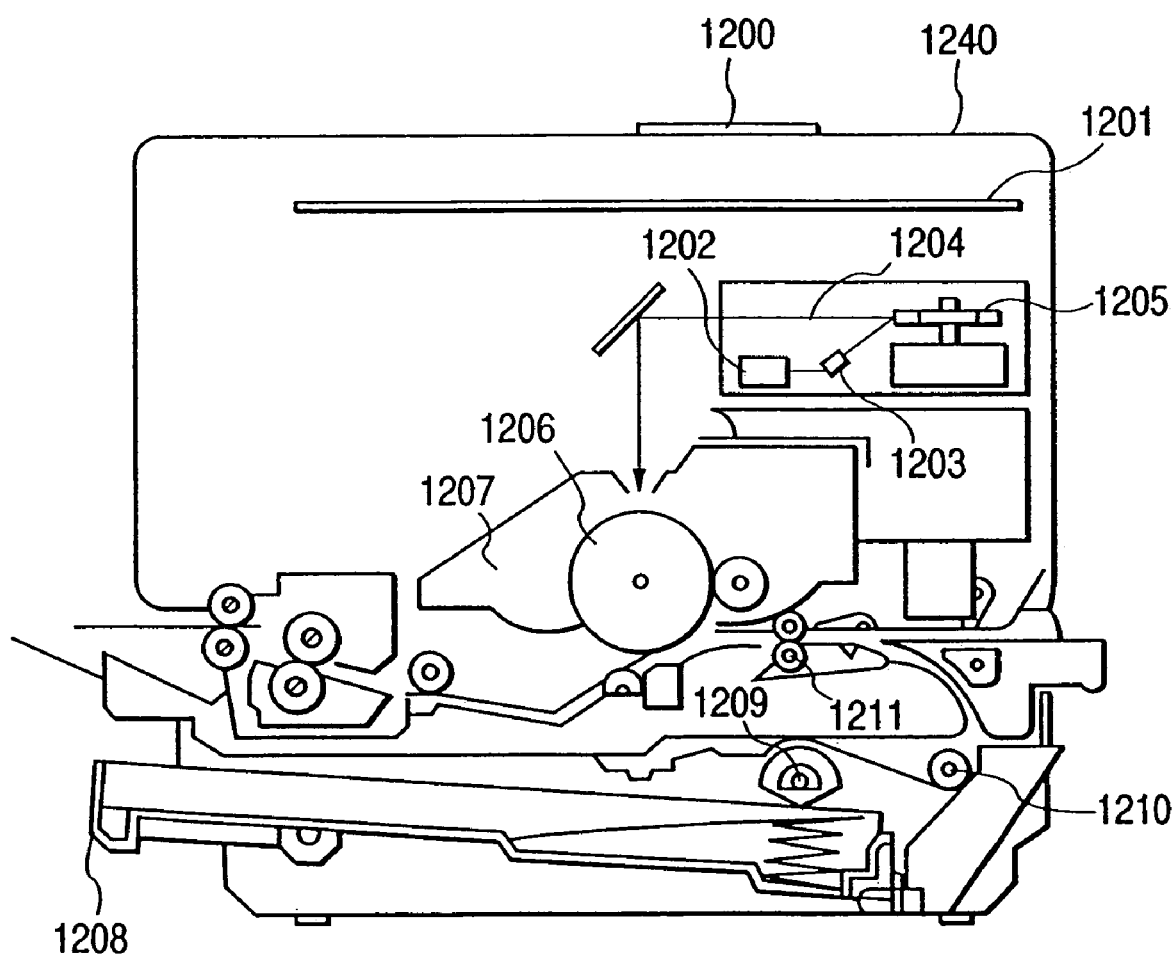
FIG. 12 is a diagram for explaining a laser beam printer.

FIG. 12 is a cross sectional view showing an internal structure of a laser beam printer (hereinafter, abbreviated to an LBP). The LBP can input character pattern data or the like and print onto a recording paper.

In the diagram, reference numeral 1240 denotes an LBP main body for forming an image onto the recording paper as a recording medium on the basis of the supplied character pattern or the like; 1200 an operation panel on which switches for operation, an LED display, and the like are arranged; and 1201 a printer control unit for controlling the whole LBP 1240 and analyzing the character pattern information or the like. The printer control unit 1201 mainly converts the character pattern information into a video signal and generates to a laser driver 1202.

The component elements of the invention can be assembled into the printer control unit 1201.

The laser driver 1202 is a circuit to drive a semiconductor laser 1203 and switches on/off of a laser beam 1204 emitted from the semiconductor laser 1203 in response to the inputted video signal. The laser beam 1204 is swung to the right and left by a rotary polygon mirror 1205 and scans on an electrostatic drum 1206. Thus, an electrostatic latent image of a character pattern is formed on the electrostatic drum 1206. This latent image is developed by a developing unit 1207 arranged around the electrostatic drum 1206 and, after that, it is transferred onto the recording paper. Cut sheets are used as recording papers. The cut sheet recording papers are enclosed in a paper cassette 1208 attached in the LBP 1240. Each paper is fed into the apparatus by a paper feed roller 1209 and conveying rollers 1210 and 1211 and is conveyed to the electrostatic drum 1206.

Although the laser beam printer has been described above as an example of the image forming apparatus of the embodiment, the invention is not limited to it but can be also applied to an ink jet printer or the like which will be explained hereinlater.

Figure 13:
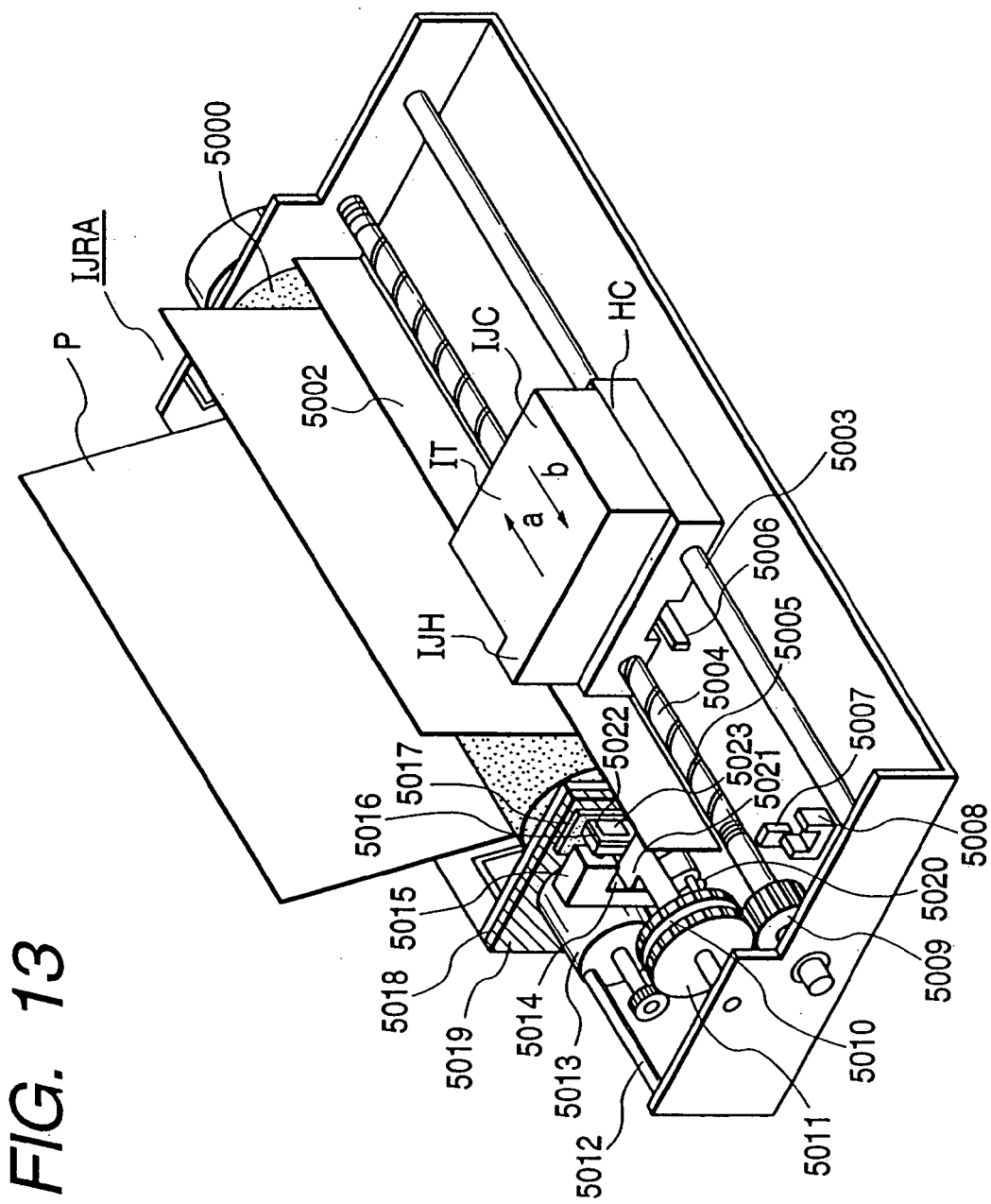
FIG. 13 is a diagram for explaining an ink jet printer.

FIG. 13 is a conceptual diagram of an ink jet recording apparatus IJRA to which the invention can be applied. In the diagram, a lead screw 5005 rotates in an interlocking relation with a forward/reverse rotation of a driving motor 5013 through driving force transfer gears 5011 and 5009. A carriage HC which is come into engagement with a spiral groove 5004 of the lead screw 5005 has a pin (not shown) and is reciprocated in the directions shown by arrows a and b. An ink jet cartridge IJC is mounted on the carriage HC. Reference numeral 5002 denotes a paper pressing plate for pressing the paper onto a platen 5000 in the moving direction of the carriage, and 5007 and 5008 indicate photocouplers serving as home position detecting means each for confirming the existence of a carriage lever 5006 in a region where each photocoupler is arranged and for performing a switching of a rotating direction of the motor 5013 or the like. Reference numeral 5016 denotes a member to support a cap member 5022 to cap the front surface of a recording head and 5015 indicates sucking means for sucking the inside of the cap, thereby performing a sucking and a recovery of the recording head via an opening 5023 in the cap. Reference numeral 5017 denotes a cleaning blade and 5019 indicates a member for enabling the blade to be moved in the front/rear direction and those component elements are supported to a main body supporting plate 5018. The blade is not limited to a form shown in the diagram but another well-known cleaning blade can be also obviously applied to the embodiment. Reference numeral 5021 denotes a lever to start the sucking in the sucking/recovery operation. The lever 5021 moves in association with the movement of a cam 5020 adapted to be come into engagement with the carriage. A driving force from the driving motor is transferred by well-known transfer means such as a clutch switching or the like.

Any desired one of the capping, cleaning, and sucking/recovery operations can be performed at each corresponding position by the operation of the lead screw 5005 when the carriage reaches a region on the home position side. However, if a desired operation is performed at a well-known timing, any one of them can be applied to the embodiment.

Figure 14:
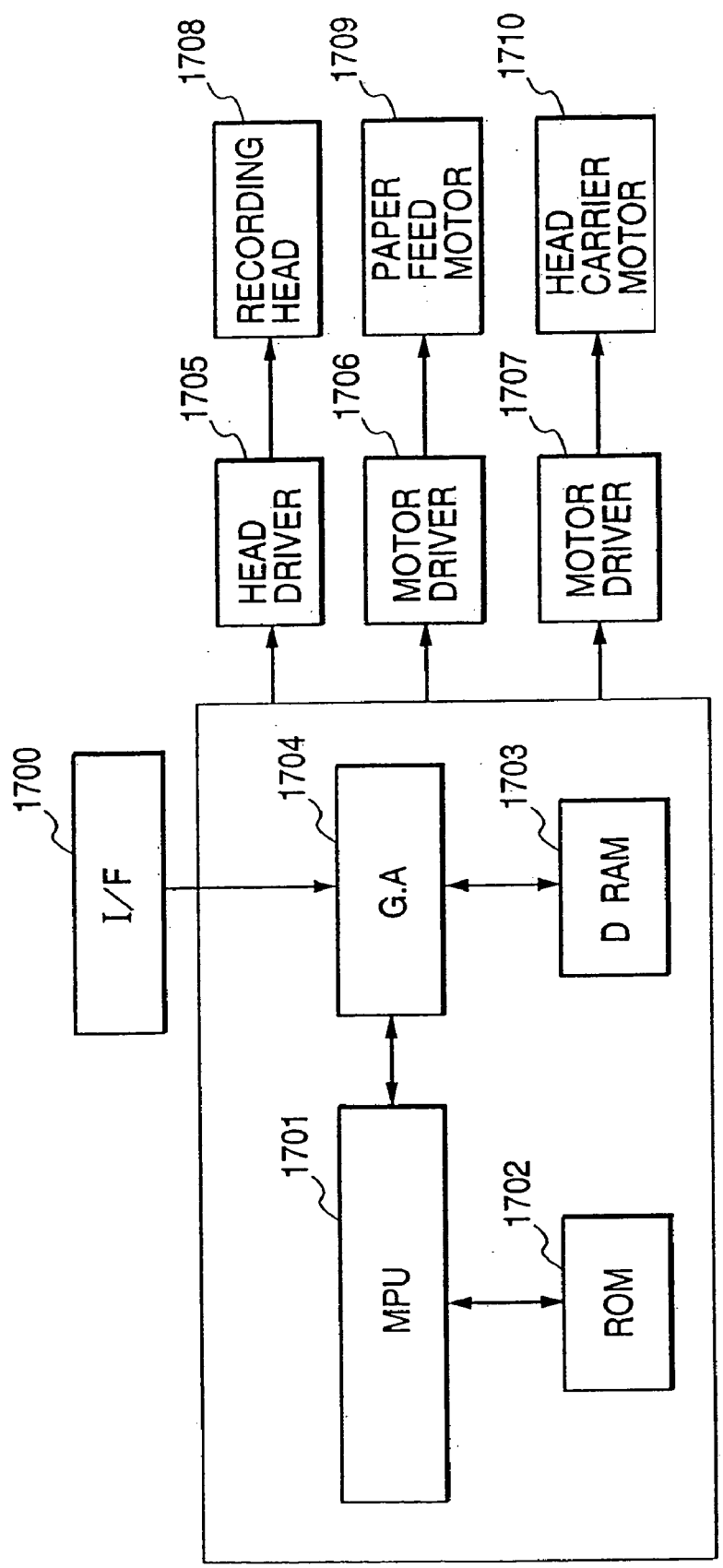
FIG. 14 is a diagram for explaining a control construction to execute a recording control of an apparatus.

A control construction to execute the recording control of the apparatus mentioned above will now be described with reference to a block diagram shown in FIG. 14. In the diagram showing the control circuit, reference numeral 1700 denotes an interface to input a recording signal; 1701 an MPU; 1702 a program ROM to store a control program which is executed by the MPU 1701; 1703 a dynamic type ROM to store various data (the recording signal, recording data that is supplied to the head, etc.); 1704 a gate array to control a supply of recording data to a recording head 1708 and to control a data transfer among the interface 1700, MPU 1701, and RAM 1703; 1710 a head carrier motor to convey the recording head 1708; 1709 a paper feed motor to feed the recording paper; 1705 a head driver to drive the head; and 1706 and 1707 motor drivers to drive the paper feed motor 1709 and head carrier motor 1710, respectively.

The operation of the above control construction will now be described. When the recording signal is inputted to the interface 1700, the recording signal is converted into recording data for printing between the gate array 1704 and MPU 1701. The motor drivers 1706 and 1707 are driven, the recording head is driven in accordance with the recording data sent to the head driver 1705, and the print is performed.

The component elements of the invention can be assembled into the control construction of the ink jet printer as mentioned above. It will be obviously understood that the invention is not limited to the laser beam printer but can be also applied to the above ink jet printer or the like.

What is claimed is:

1. A print data processing apparatus comprising:
   a reception unit, adapted to receive print data;
   a pre-processor unit, adapted to, if the print data received by said reception unit is packeted print data comprising a plurality of job packets each having a packet structure consisting of a header portion and a data portion, interpret the plurality of job packets;
   a discrimination unit, adapted to discriminate whether an identification is included in the print data received by said reception unit, the identification indicating reception of the plurality of job packets; and
   a switching unit, adapted to switch between a first print data processing method of storing non-packeted print data without sending the non-packeted print data to said pre-processor unit to process the non-packeted print data, and a second print data processing method of sending the packeted print data to said pre-processor unit to process the packeted print data, in accordance with a discrimination made by said discrimination unit.

2. An apparatus according to claim 1, wherein the identification is included in a header portion of the print data.

3. An apparatus according to claim 1, wherein the identification is included in the header portion of the job packet structure.

4. A method of processing print data, said method comprising:
   a reception step of receiving print data;
   an interpreting step of, if the print data received in said reception step is packeted print data comprising a plurality of job packets each having a packet structure consisting of a header portion and a data portion, interpreting the plurality of job packets using a pre-processor;
   a discriminating step of discriminating whether an identification is included in the print data received in said reception step, the identification indicating reception of the plurality of job packets; and
   a switching step of switching between a first print data processing method of storing non-packeted print data without sending the non-packeted print data to the pre-processor to process the non-packeted print data, and a second print data processing method of sending the packeted print data to the pre-processor to process the packeted print data, in accordance with a discrimination made in said discriminating step.

5. A method according to claim 4, wherein the identification is included in a header portion of the print data.

6. A method according to claim 4, wherein the identification is included in the header portion of the packet structure.

7. A computer-executable program stored on a computer-readable medium for processing print data, said program comprising:
   code for a reception step of receiving print data;
   code for an interpreting step of, if the print data received in said reception step is packeted print data comprising a plurality of job packets each having a packet structure consisting of a header portion and a data portion, interpreting the plurality of job packets using a pre-processor;
   code for a discriminating step of discriminating whether an identification is included in the print data received in said reception step, the identification indicating reception of the plurality of job packets; and
   code for a switching step of switching between a first print data processing method of storing non-packeted print data without sending the non-packeted print data to the pre-processor to process the non-packeted print data, and a second print data processing method of sending the packeted print data to the pre-processor to process the packeted print data, in accordance with a discrimination made in said discriminating step.

8. A program according to claim 7, wherein the identification is included in a header portion of the print data.

9. A program according to claim 7, wherein the identification is included in the header portion of the packet structure.

* * * * *

UNITED STATES PATENT AND TRADEMARK OFFICE
CERTIFICATE OF CORRECTION

| | |
|---|---|
| PATENT NO. | : 7,218,404 B2 |
| APPLICATION NO. | : 10/929458 |
| DATED | : May 15, 2007 |
| INVENTOR(S) | : Tsuchitoi |

It is certified that error appears in the above-identified patent and that said Letters Patent is hereby corrected as shown below:

<u>COLUMN 17</u>:
Line 33, "job" should be deleted.

Signed and Sealed this

Eleventh Day of March, 2008

JON W. DUDAS
*Director of the United States Patent and Trademark Office*